July 15, 1924.
C. L. MARSHALL
1,501,791
GAS EXPANDED VULCANIZED RUBBER SUBSTANCE AND PROCESS FOR MAKING THE SAME
Filed June 23, 1920
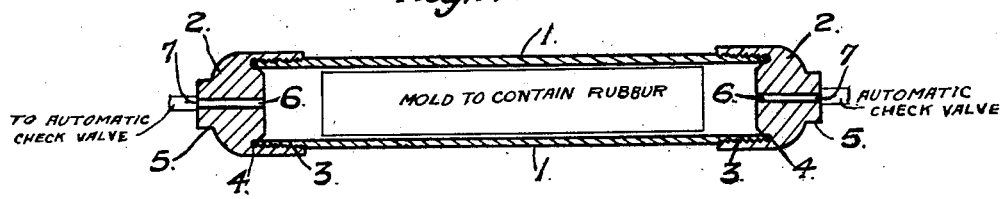
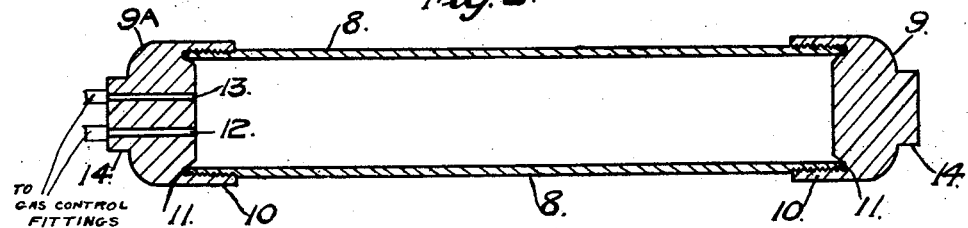

Patented July 15, 1924.

1,501,791

UNITED STATES PATENT OFFICE.

CHARLES LANCASTER MARSHALL, OF LONDON, ENGLAND.

GAS-EXPANDED VULCANIZED-RUBBER SUBSTANCE AND PROCESS FOR MAKING THE SAME.

Application filed June 23, 1920. Serial No. 391,091.

*To all whom it may concern:*

Be it known that I, CHARLES LANCASTER MARSHALL, of "Dunoon," Doyle Gardens, Harlesden, London, England, have invented certain new and useful Improvements in and Relating to an Improved Gas-Expanded Vulcanized-Rubber Substance and Process for Making the Same, of which the following is a specification.

It is well known that rubber, with the addition of vulcanizing substances containing sulphur, when treated in an auto-clave at a high temperature and under great pressure in the presence of an inert gas can be converted into a vulcanized foam or froth which has considerable commercial utility.

My invention is concerned with the manufacture of a rubber product by means, inter alia, of the same type of treatment but characterized by the fact that the structure of the finished substance, though reticulated and filled with inert gas, is of a firm semi-rigid nature.

I have found that pure rubber with the addition of vulcanizing materials, when subjected to high gas pressures and high temperatures in an auto-clave, tends on the release of the pressure or on cooling to lose the greater part of the occluded gases. In order to enable the mass to retain large quantities of gas under pressure it is necessary to modify the composition of the material by the addition of substances which reinforce or close the pores of the thin walls which constitute the reticulated structure.

I have found that substances of a waxy nature serve this purpose and that a porous mass of rubber containing a suitable proportion of such an ingredient, when heated under the high pressure of an inert gas such as nitrogen, and vulcanized, retains a much higher pressure within its cells or interstices than has heretofore been found possible. The addition of such substances also lowers the pressure necessary for complete gas penetration, seventy-five atmospheres usually being sufficient.

While I do not confine myself to the use of any particular waxy material, and since it will be found necessary to modify the requirements when using different kinds of raw rubber for various purposes, I have found that when using a crêpe plantation rubber that a high melting point ceresine wax and light magnesia in equal parts to the extent of 5 to 10 per cent of the weight of raw rubber with sufficient red antimony and sulphur to carry through hot vulcanization are sufficient for the purpose. A modification of the same can be made by using equal parts of rubber and balata to the same ingredients. The paramount object is to retain a sufficient proportion of raw rubber in the formula to enable it when expanded by gas pressure to impose its own physical qualities as the predominant constituent in the expansion formation. I have found that one-third raw rubber to other added matter of a formula will assert its power in the expansion i. e., a compound mixture which may contain as low as one-third of raw rubber with two-thirds of other added matter of a formula, that this proportion of rubber will still exert itself as the predominant component in the expanded mass.

I have also found that the above-mentioned property of rubber, free from such sealing ingredients, of losing gas and reverting to approximately its original dimensions when so treated, provides a very valuable method of forming a strongly resistant skin to the semi-rigid structure formed as above indicated.

A rubber skin is readily obtained by covering the above-mentioned raw material in the manufacture of the expanded rubber with a rubber and sulphur compound, which will not itself retain gas under pressure, and by submitting the whole to the requisite gas pressure to expand the same with the result that the outside skin will afterwards lose its gas and form a strong resisting cover to the gas-expanded material. Flat sheets of this resilient substance may be made of any thickness by simply calendering the compounded expanded rubber stock between sheets of the rubber skin compound. When required to make a circular or voluted formation the skin rubber may be placed upon one side, or both, or rolled upon a suitable former between sheets of strong paper or cotton cloth or held in suitable moulds and vulcanized. Tubes and cylinders can also be formed in a similar manner and may have an added rubber skin upon the interior and exterior alike.

This added skin of rubber, being vulcanized to the expanded rubber interior, becomes an integral part of the whole during the process of the vulcanization, and is therefore enabled to withstand punctures and external injury without thus materially affecting its efficiency. The property of making possible an increase of pressure of the expanded substance makes the skin a useful agent when high pressures are required. It is not possible to compress any spongy substance so as to retain permanently two or more atmospheres without an outer skin, because on expansion a pressure of only 1½ atmospheres will be retained and the substance cannot have the resilient and permanent properties which are obtained by my process of adding a skin which prevents the over-expansion of the substance and the fall of the pressure below 2 atmospheres when fully expanded. The substance in order to become a serviceable commodity should remain, when fully expanded, a given size, and not easily affected by atmospheric changes of temperature. The tension due to the thickness of the added skin, keeps an equilibrium of pressure between the two bodies and provides an external covering to resist abrasive wear.

By the use of the first method with or without the second I am able to manufacture a new product of extreme utility either as an insulator and non-conductor or as a shock absorber or pneumatic tyre filling or as a buoyant material for use in floats for aeroplanes or naval work.

The object and nature of the invention having been fully explained the following detailed description of the apparatus for accomplishing the results described will enable those skilled in the art to make and use the same.

Fig. 1 Nos. 1 to 7 inclusive illustrates that portion of the apparatus which controls the pressures at the beginning and end of the process when applied to the material to be treated. Referring to the drawings the following description will explain the construction of this apparatus which for convenience will be termed the "shell".

*Automatic pressure shell.*

1. Shows a thin steel shell of any suitable size or diameter for the desired manufacture and which is capable of holding a working pressure up to say 14 atmospheres.

2. Are removable steel capped ends suitably screw-threaded to fit upon end of tube 1 at point 3. At point 4 suitable copper rings or other packing are embedded for the purpose of making gas tight pressure joints.

The removable steel caps 2 are provided with suitable squared ends 5 for the use of devices to remove same from tube 1. At points 6 and 7 are openings through the steel taps 2 which are suitably arranged to receive adjustable check and pressure valves for controlling the pressure automatically at certain parts of the process which will hereinafter be more fully described.

Fig. 2. Illustrates that portion of the apparatus which controls and operates the application of the high gas pressure to the "shell" Fig. 1 and for convenience will be termed the "gun".

The high pressure gas apparatus. No. 8 illustrates a cold drawn steel tube of suitable dimensions to receive and hold the "shell." Fig. 1 having a strength capable of being operated safely at a pressure of 75 atmospheres in a temperature of 300° Fah.

No. 9 represents removable steel sealing caps suitably screw threaded to fit upon screw-threaded ends of tube 8. at point 10, with suitable packing or copper rings 11, for making pressure gas tight joints.

12 and 13 show openings in the capped ends 9 for the reception of the necessary fittings for the control of the gas pressures within the "gun" and the exhaust of the gases therefrom.

14. Illustrates suitable square ends to caps 9, 9, for the purpose of removing from the tube 8, 8.

Fig 3. Illustrates a suitably applied auto-clave upon the outside of the gun tube 8 for vulcanizing purposes which can be steam heated in the usual manner to obtain a temperature of 300° Fah. or thereabouts.

Fig. 4. Illustrates the complete assemblage of all the above parts in their respective working positions.

When the minute cells have been formed within a mass of high grade rubber by the action of an external gas under pressure capable of penetrating through the rubber when vulcanized, many ruptures take place of a minute character, and when there is no resinous or adhesive matter contained therein, the ruptures or pores cannot afterwards be sealed; it is therefore of the utmost importance to provide a sealing matter of high melting point which will readily permit the gases to pass through the rubber when submitted to a high gas pressure, and afterwards automatically seal up all porosity, and to remain permanently gas tight. To effect this use a waxy or other suitable matter as a flux which produces a liquid state from the action of heat for the passing or cutting of gas more readily through the rubber mass, which materially reduces the pressure to insert same. It also serves the purpose of making the expanded mass gas-tight. The retained gas depends on this plasticity for maintaining its high pressure.

When rubber or balata alone are used as a sole base for producing a vulcanized froth very high pressures are necessary in the manufacture, and the resultant material is incapable of holding the gas pressure permanently. In my improved substance I employ a fluxing agent which provides suitable means for sealing up the pores or ruptures.

The formation of the expanded substance in closeness and evenness of its texture depends entirely upon the manipulation of the material while in the "shell" apparatus.

A piece of rubber when submitted to a too high gas pressure comes out of the apparatus so expanded that it tears itself asunder through the effects of its interior pressure and is easily slashed or frittered away by the fingers; it will take several days' time before it becomes normal or loses its excess of gas, and then it will be found to contain a pressure of 1½ to 2 atmospheres. This seems to be the natural extent of pressure capable of retention by the rubber substance without the skin support already mentioned. It is obvious then that to obtain a substance having a higher pressure than 1½ atmospheres, it is necessary to use a substance capable of absorbing a high pressure and to control the expanding action of that gas by means of a strong resilient skin which does not retain the gases. It is necessary that this should be done during the phenomenon of the expansion.

The function of this skin is to offer a free passage to such gases as may escape from the interior of the mass, while at the same time offering such a mechanical resistance to the disruptive expansion of the interior cells as to prevent them from disintegrating with a subsequent drop of the interior gas pressure to the above named normal amount of 1½ atmospheres. In this way the interior pressures are retained to a much higher amount than has heretofore been possible.

In the operating and use of the apparatus herein described it should be noted that the process can be modified or extended to meet the requirements of a multitude of varying articles of manufacture which cannot be herein described and which it is intended to cover by this patent application. As illustrated by the drawings:—

Fig. 1 shows what is termed as the "shell" and the operation of same is as follows: One of the steel capped ends (2) is removed from the shell tube (1) which is then ready to receive its contents within suitable moulds or coverings which will allow of the penetration of the gases to their interior. Such moulds or containers need only be a little stronger than the pressure desired to be obtained in the finished product.

At points 6 and 7 are inserted and tightly fitted, check and pressure valves for controlling the pressures from 20 to 200 lbs. or more which can be arranged to automatically operate and act as the process proceeds. It is intended that the gases may not exhaust during the process of vulcanization below a given pressure.

In order to operate economically, the "shell" after receiving its load, and having the steel cap 2 tightly replaced, may be placed in a heated chamber of say 200 F. and kept there for a period of half an hour or until such time as it is needed and its contents or load is thoroughly heated through. When a substance is required which will contain a pressure of 5 atmospheres when fully expanded it will have been necessary to set the check and pressure valves to operate at a pressure of 100 lbs. or more, before the insertion of the "shell" into the "gun" at Figure 2.

Figure 2 represents the "gun" or the high pressure apparatus for applying the gas pressures to the interior and exterior of the "shell" and is operated in the following manner: The steel capped end 9 is removed, after the apparatus has been somewhat cooled down, and the "shell" Fig. 1 is then inserted and the steel cap 9 replaced in its position when it is ready for the application of the high pressure. It will be necessary to use cautionary methods at this juncture as the gas pressure should be applied very carefully and not too fast as the gas will increase in pressure somewhat owing to the heat of the "shell." It should take a few minutes only to bring the pressure up to 100 lbs. when the valve of the interior "shell" will automatically open and allow the gas to enter. At this point, the heat should be applied to the auto-clave Figure 3 15 and gradually increased simultaneously with the gas pressure until it reaches the full vulcanizing temperature which is usually about 305° F. the degree of heat being dependent upon the mixture. The expansion of the gas will then be at its highest and the pressure should be at or about 70 to 75 atmospheres. It will be necessary to maintain this pressure until the vulcanization is complete, which is usually in about two hours, or it may even be longer, or shorter, according to the kind of rubber and amount of vulcanizing agent used. The pressure can be supplied to the apparatus through the medium of high pressure cylinders or high pressure pumps, or by both. At this juncture it is necessary to reduce the heat of the vulcanizing chamber and also necessary to determine the reduction of the gas pressure. It is not necessary to reduce this pressure until the temperature has dropped 20° Fah. and vulcanization has ceased. It is at this point where the judgment of the operator needs to be good, as the quality or the fineness of the froth formation is determined then simply by a quick and active reduction of the pressure, which should take place as rapidly as the exhaust will allow until the entire pressure has left the "gun."

This gives the fine expanded structure, which is described.

The dissolved gas in the rubber is minutely divided, as are also the cells of the reticulated structure, and at the end of the vulcanization the mass is more or less liquid which is probably in consequence of overfusion through pressure. When this latter is withdrawn suddenly overfusion disappears and a kind of immediate freezing or hardening of the rubber takes place and the gas is trapped in the natural division of the cells which gives the finely divided structure. If on the contrary the pressure is withdrawn slowly (say 10 minutes) the rubber mass congeals slowly before obtaining the resistance of the walls which separate the expanding cells, and the difference of pressure of neighboring cells brings about a rupture of said walls which causes a number of cells to form into a single one with the result being a coarsely divided structure.

When high pressures of 300 atmospheres or more are used it is practically impossible to form a uniform fine and close texture of the material as is now possible by the herein described process. The finer and closer the texture the stronger is the material.

The pressure which has been trapped in the "shell" by the automatic valve at 100 lbs. or thereabouts, will have acted as a resilient counter-pressure to the rapid expansion within the articles in the shell and prevent their disintegration or rupture. This pressure now acts as a flexible mould and exerts an external pressure to the articles within and should be continued until some hours have elapsed and the substance is thoroughly cold and there is no danger of rupture.

The "shell" may be removed from the "gun" as soon as its gas pressure has all been exhausted, and then set aside to cool so that the "gun" may be recharged without loss of time. A number of "shells" can be provided for each "gun" so as to make the process more economical and continuous.

To exhaust the pressure from the "shell" a gas releasing device can be inserted into the outside portion of the opening in the "shell" at 7 which will operate against the valve center at 6 which will allow the gas to escape and the cap to be removed.

Fig. 2. Shows the auto-clave covering to the "gun" which may be made of steel and steam heated.

Fig. 4. Illustrates the complete apparatus in working position.

The necessary pressure gauges and safety valves, with exhaust outlets and valves to same are provided at all needed points but are not shown.

Having now particularly described and ascertained the nature of my said invention and in what manner the same is to be performed, I declare that what I claim is:—

1. The process of making expanded rubber, consisting in providing a mixture of raw rubber and fluxing material, together with vulcanizing material, applying a skin of rubber and sulphur compound, to such mixture of raw rubber, vulcanizing the same, subjecting the same while being vulcanized to the action of an inert gas under such pressure as to cause the gas to penetrate the same, and then relieving such gas pressure.

2. The process of making expanded rubber, consisting in providing a mixture of raw rubber and a fluxing material, together with a sufficient quantity of red antimony and sulphur to cause vulcanization; providing such mixture with a skin of rubber and sulphur compound, vulcanizing the same, subjecting the same while being vulcanized to the action of an inert gas under such pressure as to cause the gas to penetrate the same, and then suddenly relieving such gas pressure.

3. A vulcanized compound rubber substance consisting of an interior mass of rubber with the admixtures of a suitable sealing compound of gas, and an exterior skin of rubber under tension in equilibrium with the interior gas.

In testimony whereof I affix my signature in presence of two witnesses.

CHARLES LANCASTER MARSHALL.

Witnesses:
JOHN LIDDLE,
JOHN TRAIN LIDDLE.